Patented June 30, 1970

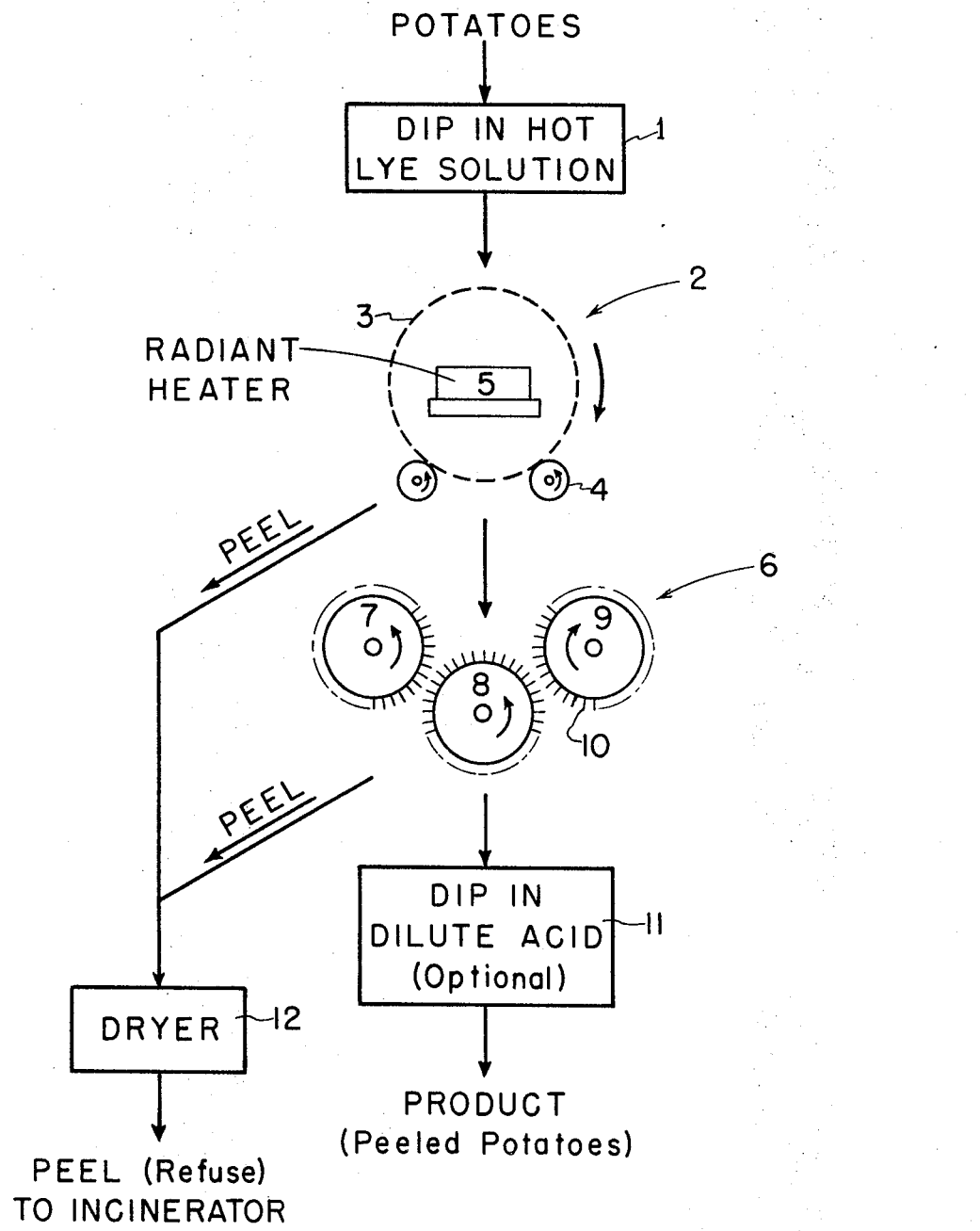

3,517,715
PROCESS FOR PEELING POTATOES
Robert P. Graham, El Cerrito, Charles C. Huxsoll, San Pablo, Marcus R. Hart, Concord, and Merle L. Weaver, Martinez, Calif., asssignors to the United States of America as represented by the Secretary of Agriculture
Filed Dec. 19, 1967, Ser. No. 691,740
Int. Cl. A23n 7/02
U.S. Cl. 146—231               2 Claims

ABSTRACT OF THE DISCLOSURE

Potatoes are dipped in hot lye solution, exposed to radiant heat under controlled conditions to attain loosening of the peel without any charring effect, and the loosened peel is removed by dry brushing. A key feature of the procedure is that the waste—the removed peel—is in a solid condition and easily disposed by burning.

---

A non-exclusive, irrevocable, royalty-free license in the invention herein described, throughout the world for all purposes of the United States Government, with the power to grant sub-licenses for such purposes, is hereby granted to the Government of the United States of America.

This invention relates to and has among its objects the provision of novel processes for peeling potatoes. More particularly, the invention provides procedures which not only give efficient peeling results but also which form waste material which is readily disposable. Further objects of the invention will be evident from the following description wherein parts and percentages are by weight unless otherwise specified.

The figure in the annexed drawing is a schematic diagram or flow sheet of the process of the invention.

In conventional practice in food processing plants, potatoes are peeled by applying the following procedure: The potatoes are immersed in hot lye solution—e.g., a solution containing about 20% NaOH and maintained at about 150° F. The potatoes are held in the lye solution until the peels are softened and loosened. Then, the tubers are removed and subjected to strong jets of water while rotated or tumbled about to expose all surfaces to the jets whereby the lye-loosened skin is flushed off the tubers. Although this procedure provides effective peeling, it has the disadvantage that it produces a large volume of wash water containing organic matter and sodium hydroxide. The disposal of this waste liquor presents a serious problem. If discharged directly into a stream it causes pollution of the water course. Moreover, biological destruction by ponding or the like is slow and inefficient, particularly because of the high alkalinity of the liquor. Of course, the liquor could be neutralized but this would involve additional expense for acid and for equipment for metering the acid and maintaining a predetermined pH. Because of the present emphasis by federal, state, and local governments on pollution control, food processors who rely on the procedure in question are facing a crisis—they must devise a disposal system which not only meets anti-pollution standards, but also does the job economically so that they can stay in business. A failure to meet these criteria means that the operations must be shut down.

A primary object of the invention is the provision of peeling methods which obviate the problems outlined above. A particular feature of the invention is the elimination of the conventional step of removing the lye-loosened peel with water. Instead, a procedure is employed which permits removal of the peel in a dry manner. As a consequence the process of the invention does not yield a liquid waste material. It yields a solid waste which can be burned directly, or after application of a minor degree of dehydration. Burning of the waste is not only an effective and economical method of disposal thereof but also yields thermal energy which can be utilized in various ways in the plant. Moreover, the remaining ash can be treated to extract sodium carbonate therefrom. (The NaOH in the waste is converted into the carbonate during combustion.)

In addition to obviating the problem of waste disposal, the process of the invention provides effective peeling so that the peeled tubers are adapted for all conventional uses as in preparing dehydrated, pre-fried frozen, canned, and other potato products. The peeling losses average only about 7 to 10%.

In a practice of the invention, potatoes are first contacted with aqueous lye (NaOH). This is best done by immersing the tubers in the lye solution. Alternatively, the lye solution may be applied by spraying, brushing, or the like. Generally, the solution will contain about 15 to 30% of NaOH and is kept hot, i.e., at about 150–212° F. so it will penetrate rapidly into the corky tissue of the peel. When all surfaces of the potatoes have been thoroughly wetted with the lye solution, the tubers are ready for the next step. Preferably, but not necessarily, the lye-treated potatoes are drained—for example, by allowing them to roll down an inclined screen for a few seconds—before initiating the next step.

Next, the lye-treated potatoes are exposed to radiant heat supplied, for example, by conventional radiant heaters which provide elements brought to incandescence (i.e., at least 1200° F.) by electrical power, or by combustion of propane or other gaseous or liquid fuels. Particularly preferred are the modern gas-fired devices used for heating patios, outdoor restaurants, etc. These heaters include a porous ceramic plate treated with a catalyst. Propane or natural gas is fed through the plate and burns over the entire surface thereof, bringing the plate to incandescence and thereby providing a large area from which radiant energy is uniformly emitted. Since radiant energy is effective only when a line of sight between source and the area to be heated is established, it is necessary to provide some arrangement to ensure that all points on the surfaces of the potatoes come into such relationship with the radiant source. For example, one may provide a drum within which is located a radiant heater. The lye-treated potatoes are fed into the drum which is then rotated. As the drum rotates the potatoes roll and tumble about so that all surfaces thereof are exposed to the energy emitted by the radiant source. Another plan is to convey the lye-treated potatoes under a bank of radiant elements while the potatoes are supported on a conveyor equipped with rollers, vibrators, or other suitable means to roll or tumble the tubers about both major and minor axes so uniform exposure of all surfaces will be attained.

By exposure of the lye-treated potatoes to radiant heat, various desirable effects are attained—the peel is heated, moisture in the peel is evaporated, and the lye solution in and on the peel is concentrated, i.e., made more caustic. These effects co-act to expedite hydrolytic destruction of the binding substances in the peel and those which hold the peel to the flesh. The net result is that the potatoes are rapidly brought to a state where the peel is in a loosened state so that it can readily be removed. The time of exposure to radiant energy required to achieve this state will vary depending on several factors such as the variety of potatoes, the maturity thereof, and particularly the amount of radiant energy applied to the tubers. The proper time for a specific batch of potatoes exposed to a particular radiant source is readily determined by testing the tubers at intervals and discontinuing the treatment when the peels are loose and readily removable. In many cases this can be done by observation, since when the potatoes appear dry on the surface they are ready for the next operation. A critical factor is that the treatment should not be so severe as to cause charring or burning of the peel. If this occurs at least part of the peel is converted into a black smudgy material which becomes smeared over the tubers during the subsequent operation (peel removal). In other words, when it is attempted to remove the charred peel by applying friction the equipment becomes smeared with the clinging sooty char which is then transferred onto the surface of the peeled tubers. The net result is that the peeled potatoes are not clean— as they are when the conditions of radiant heat application are limited to attain peel loosening—but are dirty. They are stained with deposits of sooty material. Accordingly, in such case washing with water is essential to obtain a satisfactory product. In sum, where charring takes place, peel removal in the dry state is not feasible and one must resort to washing—with its attendant problems—as in conventional procedures. Moreover, there is the matter of flavor. When charring occurs various empyreumatic substances are produced which exhibit most disagreeable odors and tastes. The potato flesh absorbs some of these offensive substances with the result that the product is substandard—it exhibits foreign odor and taste and cannot be used until it is pared to remove the tainted layers of flesh.

After application of radiant heat as above described, the potatoes are subjected to friction—for example, brushing—applied in the dry state. Excellent results are obtained by contacting the potatoes with a rotating cylinder, the surface of which is covered with protruding fingers of soft rubber, Neoprene, or other elastomer. The non-abrasive brushing effect obtained by the action of these fingers striking against the tubers causes the loosened peel to be dislodged quickly and without removal of any significant amount of potato flesh. Moreover, the peeling action is so effective that even the peel at indented areas (eyes) is removed. For large-scale operations, one may provide several drums (provided with soft rubber fingers) arranged with their axes parallel, and driven in such manner that each adjacent pair of drums rotate in opposite directions. By applying the treated potatoes to such an arrangement the tubers are continuously rolled and tumbled while being brushed by the rubber fingers, and the loosened peel is quickly dislodged. During the brushing, jets of air (at room temperature, or heated, for example, to 100–200° F.) may be directed against the potatoes to assist in dislodging the peels, and against the brushing device to blow particles of peel off the rubber fingers or other equipment parts.

Following removal of the peels the potatoes may be given a dip in dilute acid (for example, 1% HCl) to neutralize any caustic entrapped in bruises, soft spots, cuts, or the like and the tubers then forwarded to the processing line for conversion into dehydrated, canned, frozen, or other products as desired by the operator.

The practice of the invention is further illustrated by the annexed drawing. Referring thereto, the potatoes to be peeled are first dipped in hot lye solution 1, then introduced into the radiant heating unit, generally designated as 2. This unit includes a drum 3 of perforated metal, supported and rotated by rollers 4. Within drum 3 is located a radiant heater 5 which directs radiant energy downwardly. As drum 3 rotates, the lye-treated potatoes are rolled and tumbled about so that all surfaces are exposed to the radiant energy. After this, the potatoes are fed to the peeling unit, generally designated as 6, which includes rollers 7, 8, and 9 each driven in the directions indicated by the arrows. The surface of each of the rollers is covered with protruding fingers 10 of soft rubber. In a typical installation wherein rollers 7, 8, and 9 have a diameter of about 8", excellent peeling effects are obtained where roller 8 is rotated at a relatively high speed (about 500–600 r.p.m.) and rollers 7 and 9 at a relatively slow speed (about 50–100 r.p.m.) In a preferred arrangement, rollers 7, 8, and 9 are arranged with their axes parallel and sloping so that the potatoes will gradually be conveyed from the high end of the tier of rollers to the low end, while being brushed and tumbled about by the co-action of the rollers and thereby producing a clean, peeled product. After peeling, the potatoes may be given a brief dip in dilute acid bath 11 to neutralize any traces of lye which may collect in crevices, bruises, or the like. The peeled potatoes are then ready for processing into any selected end product by conventional procedures. Suitable trays, pans, or the like may be positioned beneath rollers 7, 8, and 9 to receive the bits of peel brushed off the potatoes. Ordinarily, some peel is detached from the potatoes during the treatment in radiant heater unit 2, and this refuse material may be likewise collected in trays or pans. As noted above, the removed peel is a granular meal which can be readily collected, dried to increase its solids content to about 30% in drier 12, and then disposed by burning in a conventional incinerator.

EXAMPLE

The invention is further demonstrated by the following illustrative example.

Potatoes (Russet variety) were weighed and then dipped in an aqueous solution of NaOH (20%) for 45 seconds at 170° F.

The potatoes were removed from the lye solution and placed in a rotating drum made of perforated metal and mounted with its axis horizontal. A propane-fired radiant heater having a power output of 30,000 B.t.u. per hour was positioned within the drum, and oriented so that the radiant heat was directed against the potatoes which were then tumbled about at the bottom of the drum. Exposure to the radiant heat was maintained for about 120 seconds.

The treated potatoes were then subjected to brushing by the action of a rotating drum, the surface of which was covered with protruding soft rubber fingers. The peel— including that in the eyes—was quickly and effectively removed by this brushing action. Weighing of the product indicated that the average peeling loss was 9%. The removed peel was a somewhat mealy mass having an average solids content of 25%.

Having thus described the invention, what is claimed is:

1. A process for peeling potatoes which comprises:
    (a) applying a hot lye solution to unpeeled potatoes;
    (b) exposing the lye-treated unpeeled potatoes to radiant heat at an energy level and for a time sufficient to loosen the peels but insufficient to cause charring; and
    (c) removing the loosened peels without application of water by non-abrasive dry brushing.
2. The process of claim 1 wherein the loosened peels are removed by dry brushing with soft, rubbery, non-abrasive elements.

References Cited

UNITED STATES PATENTS

| | | | |
|---|---|---|---|
| 1,948,884 | 2/1934 | Patterson | 146—46 |
| 3,017,298 | 1/1962 | Wilson et al. | 146—234 |
| 3,370,627 | 2/1968 | Willard | 146—46 |

WILLIAM S. LAWSON, Primary Examiner

F. R. BILINSKY, Assistant Examiner

U.S. Cl. X.R.

146—46, 49